US005297021A

United States Patent [19]

Koerlin et al.

[11] Patent Number: 5,297,021

[45] Date of Patent: Mar. 22, 1994

[54] ZERO SHEAR RECLINER/TILT WHEELCHAIR SEAT

[76] Inventors: James M. Koerlin, 950 Lilac St., Broomfield, Colo. 80020; J. Leslie Tausz, 27 Laureleaf Rd., Thornhill, Ontario, Canada

[21] Appl. No.: 977,271

[22] Filed: Nov. 16, 1992

[51] Int. Cl.⁵ .......................... G06F 15/20; B60N 2/02

[52] U.S. Cl. .......................... 364/167.01; 180/907; 280/250.1; 297/DIG. 4; 297/354.12; 364/183; 364/424.05

[58] Field of Search .................... 364/142, 167.01, 183, 364/425, 424.05, 413.01, 413.02; 318/466, 632; 280/250.1, 304.1, 47.38; 297/DIG. 4, 68, 83, 84, 85, 90, 353-355; 180/907

[56] References Cited

U.S. PATENT DOCUMENTS

| | | | |
|---|---|---|---|
| 3,191,990 | 6/1965 | Rugg et al. | 297/83 |
| 3,284,126 | 11/1966 | Piazza | 296/20 |
| 3,495,869 | 2/1970 | Ingemansson | 297/71 |
| 4,204,255 | 5/1980 | Cremer | 364/424.05 |
| 4,375,900 | 3/1983 | Tachibana et al. | 364/174 X |
| 4,565,385 | 1/1986 | Morford | 280/289 WC |
| 4,655,471 | 4/1987 | Peek | 280/242 WC |
| 4,759,561 | 7/1988 | Janssen | 280/242 WC |
| 4,966,379 | 10/1990 | Mulholland | 280/242.1 |
| 4,972,351 | 11/1990 | Reger et al. | 364/473 X |
| 5,033,000 | 7/1991 | Littlejohn et al. | 364/424.05 |
| 5,044,647 | 9/1991 | Patterson . | |
| 5,123,495 | 6/1992 | Littlejohn et al. | 364/424.05 X |

FOREIGN PATENT DOCUMENTS

| | | |
|---|---|---|
| 84201412 | of 1985 | European Pat. Off. . |
| 2517418 | of 1976 | Fed. Rep. of Germany . |
| 7309461 | of 1975 | Netherlands . |
| 2029334A | of 1980 | United Kingdom . |

OTHER PUBLICATIONS

Tarsys Engineering, Inc. "Tilt & Recline Systems" Toronto, Canada; Date unknown.

*Primary Examiner*—Joseph Ruggiero
*Attorney, Agent, or Firm*—Rick Martin

[57] ABSTRACT

A wheelchair seat has a backrest assembly with a counter balance to provide equilibrium. A control loop is included on the sliding backrest to sense the onset of shear and compensate the backrest to a zero shear position during recline. A legrest assembly has a selectable lift arrangement for either independent or recline lift.

7 Claims, 14 Drawing Sheets

ZERO SHEAR RECLINER/TILT WHEELCHAIR SEAT

CROSS REFERENCE PATENTS

U.S. Pat. No. 5,044,647 (1991) to Patterson is incorporated herein by reference.

FIELD OF THE INVENTION

The present invention relates to multi purpose wheelchair seats having options to recline without shear or selectably raise the legrest with or without extension.

BACKGROUND OF THE INVENTION

Wheelchair seats capable of reclining while maintaining the user's center of gravity centered over the base structure is taught in U.S. Pat. No. 5,044,647 (1991) to Patterson. The entire seat unit slides forward by means of a cam during recline, thereby maintaining the user's center of gravity substantially unchanged over the base structure during recline.

The present invention improves upon the design and mechanical execution of the Patterson invention.

Additionally the present invention provides a breakthrough to the persistent problem of friction (known as shear) between the user's back and the backrest during the recline operation. Already known in the art is the design approach of moving the backrest pivot point as far forward and raised as is possible thereby partially compensating for the misalignment of geometry between the user's hip rotation and the backrest pivot rotation. An uncompensated recliner will slide about six inches down a user's back during a recline operation. For paralysis victims, this will cause a detrimental breakdown of the skin after continued use.

One known solution is sold by Tarsys Engineering, Inc. 101 Bartley Drive, Toronto, Canada M4A 1C9. They offer a tilt and recline wheelchair seat having a sliding backrest. The sliding backrest is powered by an adjustable rate actuator. When properly adjusted the sliding backrest is moved the proper rate relative to the reclining back assembly, thereby providing a zero shear backrest.

However, the system depends on the paralysis victim or a medical assistant to calibrate and maintain adjustment of the adjustable rate actuator. Therefore, skin damage can occur before an error in the calibration of the adjustable rate actuator is noticed.

The present invention provides a free floating backrest having a counter balance. A further improvement includes a closed loop control system to sense the onset of shear and by program control move the backrest to a zero shear condition. No operator invention is required.

A further improvement to legrest lift systems is provided. A user can be independently raising the legrest, and the legrest will lengthen accordingly. Additionally, the user can recline while raising the legrest, and the system will, maintain a fixed legrest length as is necessary.

SUMMARY OF THE INVENTION

The main object of the present invention is to provide a reclining backrest in equilibrium with a counter balance in order to provide zero shear during recline.

Another object of the present invention is to provide a control loop in the backrest which is in equilibrium to provide automatic sensing and positioning of the backrest, thereby providing a zero shear automated backrest.

Another object of the present invention is to provide an adjustably sized seat in a recliner.

Another object of the present invention is to provide an improved means having a linear bearing for moving the seat and back assembly forward during recline.

Another object of the present invention is to selectably choose between extending the legrest during independent legrest elevation or locking the legrest length during a recline operation.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1(*b*) is the same view as FIG. 1(*a*) with the tilt mechanism extended.

FIG. 1(*c*) is a right side plan view of a four bar linkage tilt system.

FIG. 1(*d*) is a right side plan view of the four bar linkage tilt system of FIG. 1(*c*) in the tilted position.

FIG. 2(*b*) is the same as FIG. 2(*a*) with the back reclined.

FIG. 2(*c*) is a right side plan view of a recline assembly having a back cushion.

FIG. 2(*d*) is the same as FIG. 2(*c*) with the back reclined.

FIG. 2(*e*) is a close up of the seat in FIGS. 2(*a, b, c, d*) showing the bracket mounting holes.

FIG. 2(*f*) is a close up of the mounting bracket 93 of FIGS. 2(*a, b, c, d*).

FIG. 2(*g*) is a close up of the mounting bracket 93 showing mounting bolts.

FIG. 6(*b*) is the same as FIG. 6(*a*) with the backrest partially reclined.

FIG. 9(*b*) is the same as FIG. 9(*a*) with the legrest raised for the independent elevation extended position.

FIG. 9(*c*) is the same as FIG. 9(*a*) with the legrest raised and collapsed for the recline position.

FIG. 10(*b*) is a front perspective view of the legrest of FIG. 10(*a*) partially raised.

Figure 1A:
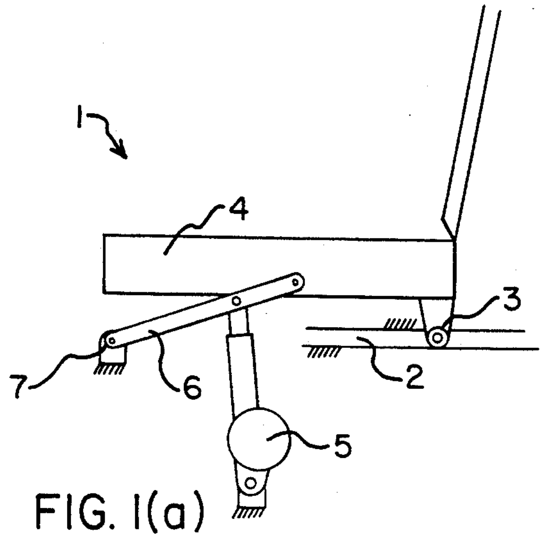
FIG. 1(*a*) is a right side plan view of a compensating tilt mechanism.
Figure 1B:
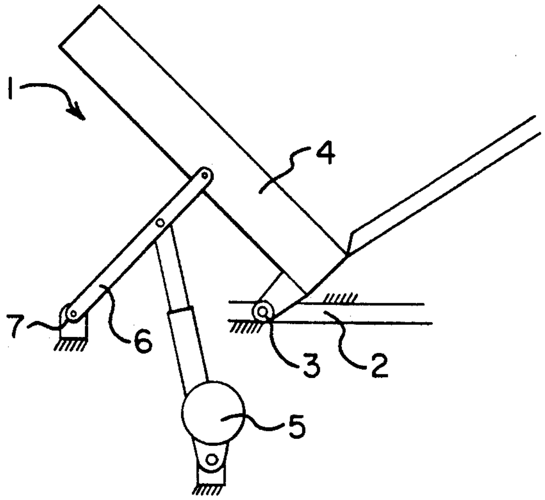
Figure 1C:
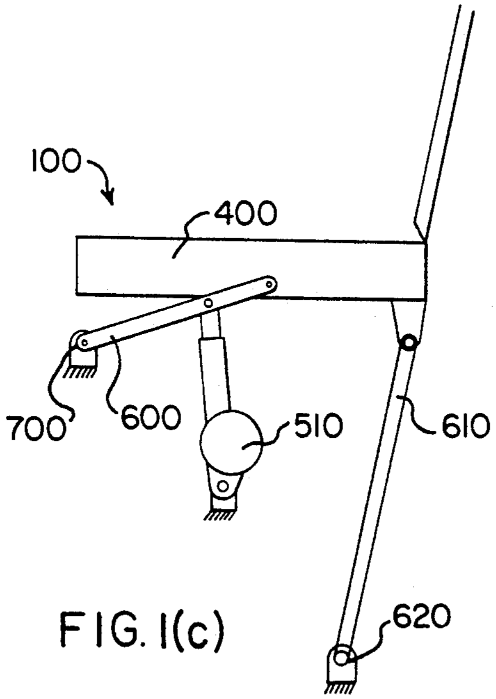
Figure 1D:
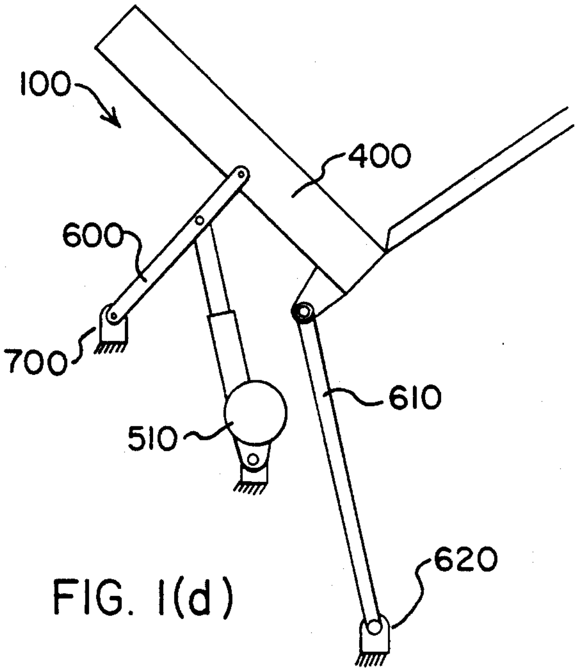
Figure 2A:
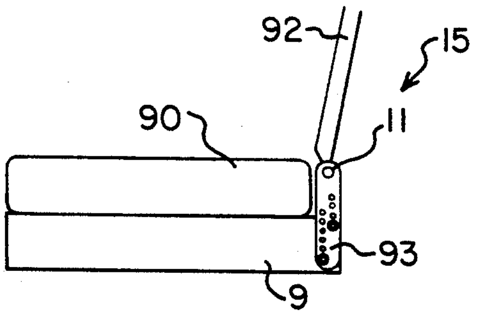
FIG. 2(*a*) is a right side plan view of a recline assembly having an adjustable pivot point.
Figure 2B:
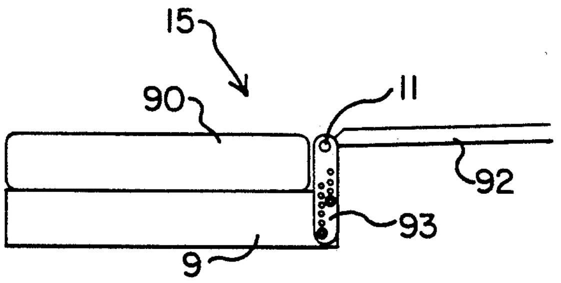
Figure 2C:
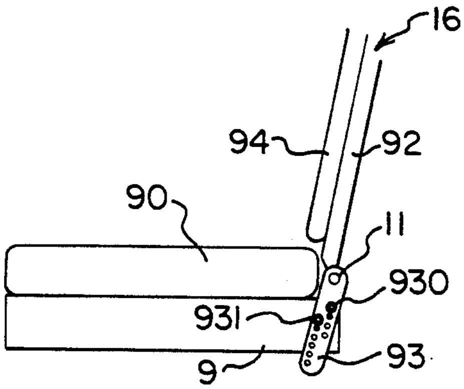
Figure 2D:
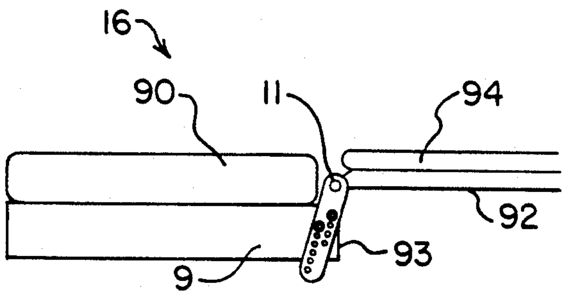
Figure 2E:
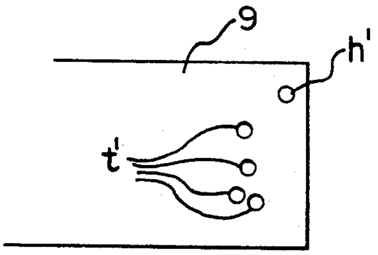
Figure 2F:
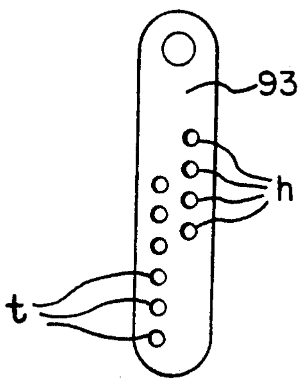
Figure 2G:
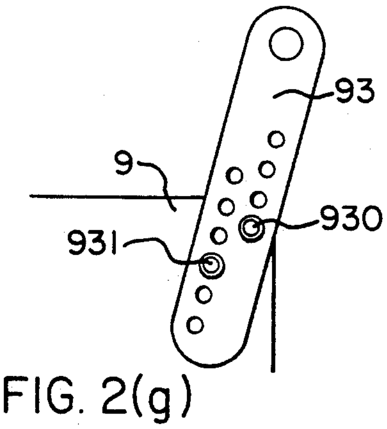

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENT

Referring first to FIG. 1, a tilt mechanism 1 is displayed in the upright position The tilt mechanism 1 is designed primarily for use as mounted on a wheelchair (not shown) in order to vary the tilt of a user as shown in FIG. 1 (*b*). Thus, the user receives a shift in body weight to permit circulation in essential skin areas.

Incorporated by reference herein is U.S. Pat. No. 5,044,647 (1991) to Patterson. Patterson shows at FIGS. 5, 7 cam plates 174,176 having central curved slots 184, 186. Cam follower pins 60,62 support the chair. As the chair is tilted back, the cam follower pins slide forward in curved slots 184,186 and keep the center of gravity of the user substantially centered over the wheelchair axle.

The present invention uses a roller 3 affixed to the base of seat 4. The roller 3 travels forward in linear bearing 2 when the tilt mechanism 1 tilts backwards as in FIG. 1(*b*). Thus, the center of gravity of the user remains substantially centered over the wheelchair axle (not shown) just the same as in the Patterson patent. The tilt actuator 5 pushes on linkage 6 to tilt the seat 4. Fixed pivot 7 provides the fulcrum to tilt the seat 4.

Referring next to FIGS. 1(*c*)(*d*) the same invention in an alternative embodiment is shown. A tilt mechanism 100 is comprised of a four bar linkage system. The seat 400 is pivotally supported by forward bar 600 which has an anchor 700 on the wheelchair (not shown) and rear bar 610 which has a corresponding anchor point 620. As the actuator 510 extends it raises forward bar 600 thereby tilting the tilt mechanism 100 while simultaneously moving rear bar 610 and seat 400 forward. This keeps the user's center of gravity centered during the tilt operation.

FIGS. 2(*a*)(*b*)(*c*)(*d*)(*e*)(*f*)(*g*) illustrate an improvement of shear reduction by raising the pivot point in reclining assemblies 15, 16. FIGS. 2(*a*)(*b*) show a pivot point 11 for the back 92. Seat 9 remains stationary in all FIGS. 2(*a*)(*b*)(*c*)(*d*). Back 92 moves to the recline position from FIG. 2(*a*) to 2(*b*).

It is known in the art that the closer pivot point 11 can be moved to the hip, the less the shear. Adjustable bracket 93 allows precise adjustment of the pivot point 11 not only to coincide with the user's anatomy, but to compensate for seat cushion 90 and back cushion 94.

Height holes h allow compensation for seat cushion 90. Tilt holes t allow compensation for back cushion 94. As shown in FIGS. 2(*e*)(*f*)(*g*) holes h and t must be selectively aligned with holes h' and t' for various user anatomies and cushion variations. Bolts 930, 931 securely fasten adjustable bracket 93 at a different height and tilt adjustment in FIGS. 2(*c*)(*d*) than in FIGS. 2(*a*)(*b*). FIG. 2(*g*) shows a better view of bolts 930, 931 securing adjustable bracket 93 to seat 9.

Figure 3:
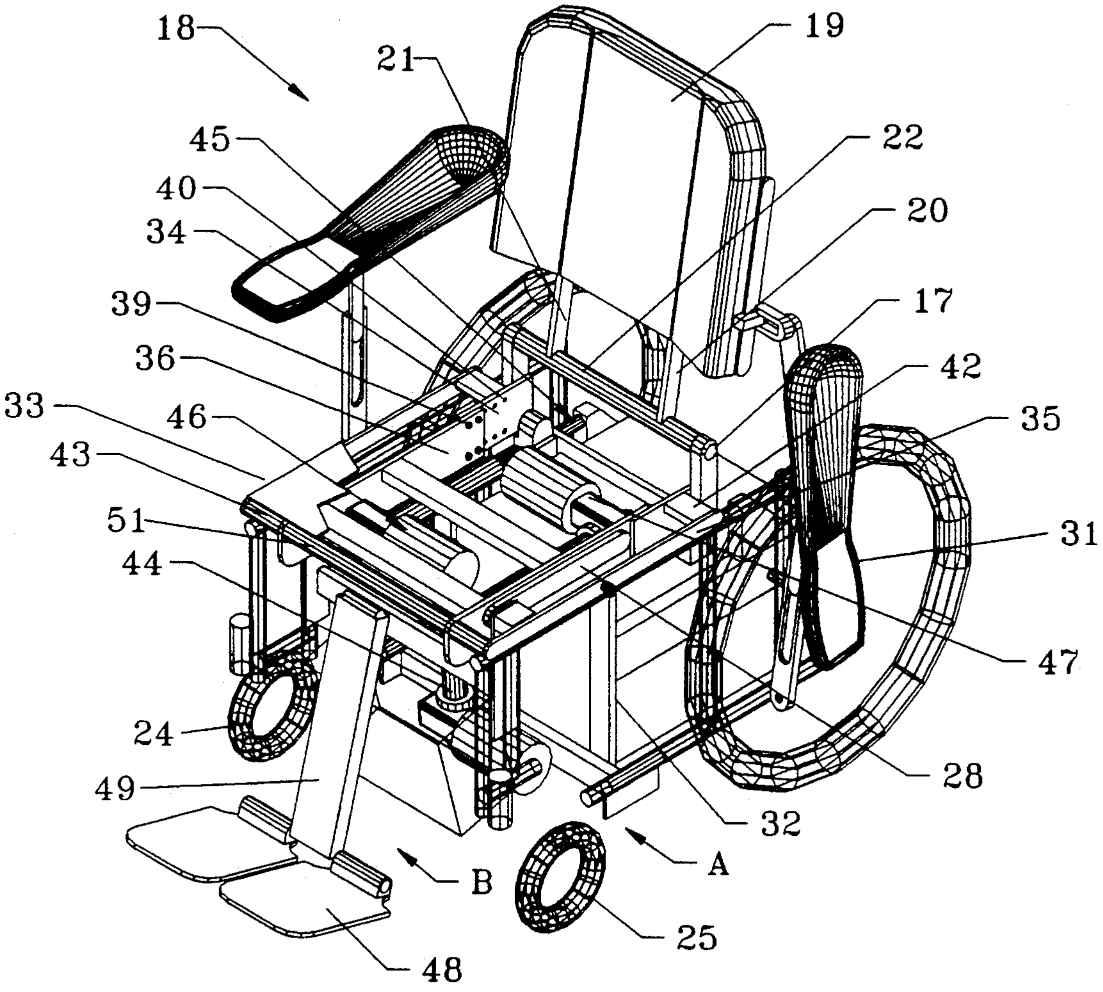
FIG. 3 is a top perspective view with a partial cutaway of a wheelchair having an automated backrest, adjustable seat, and legrest.

Referring next to FIG. 3, the recliner raised pivot point 17 is shown in the tilt recliner wheelchair 18. The backplate 19 is slidably mounted on reclining support rails 20, 21. Reclining support rails 20, 21 are affixed to the reclining assembly mounting bar 22 which pivots around the recliner raised pivot 17.

Referring again to FIG. 3 the tilt recliner wheelchair 18 has wheels 24 25, and wheelchair frame assembly A having members 28, 31, 32. Seat 33 is mounted atop wheelchair frame assembly A. Seat frame members 34, 36 have multiple mounting holes 40, etc. in order to allow a variable length for seat 33. Bolt 39 is placed at the desired mounting holes 40 to custom fit the user's needs. Likewise, variable length spacers 42,43 (corresponding parts on the opposite side are identical in function and not numbered) allow for a custom sized width for seat 33.

Three actuators mounted on wheelchair frame assembly A provide the requisite tilt, recline and legrest movements. The tilt actuator 44 is analogous to the tilt actuator 5 in FIGS. 1(*a*)(*b*). When seat 33 and back 19 are in a fixed spatial relationship to one another, then tilt actuator 44 can tilt assembly 33, 19. The raised pivot point 17 will move forward by means of linear bearing 45 (analogous to linear bearing 2 of FIGS. 1(*a*)(*b*)).

When seat 33 is allowed to pivot around raised pivot point 17, then recline actuator 46 can move back 19 adjustably down to a supine position.

The legrest actuator 47 operates independently from either the tilt actuator 44 or the recline actuator 46. The largest actuator 47 raises the legrest assembly B having members 48, 49, 51 adjustable from perpendicular to parallel to seat 33.

The present invention provides a unique method of eliminating friction between the user's back and back 33 in FIG. 3 during the recline operation. Shear in this setting concerns the displacement of a user seated in the tilt recliner wheelchair 18 as caused by the misalignment of geometry between the user's hip joint and raised pivot point 17.

Figure 4:
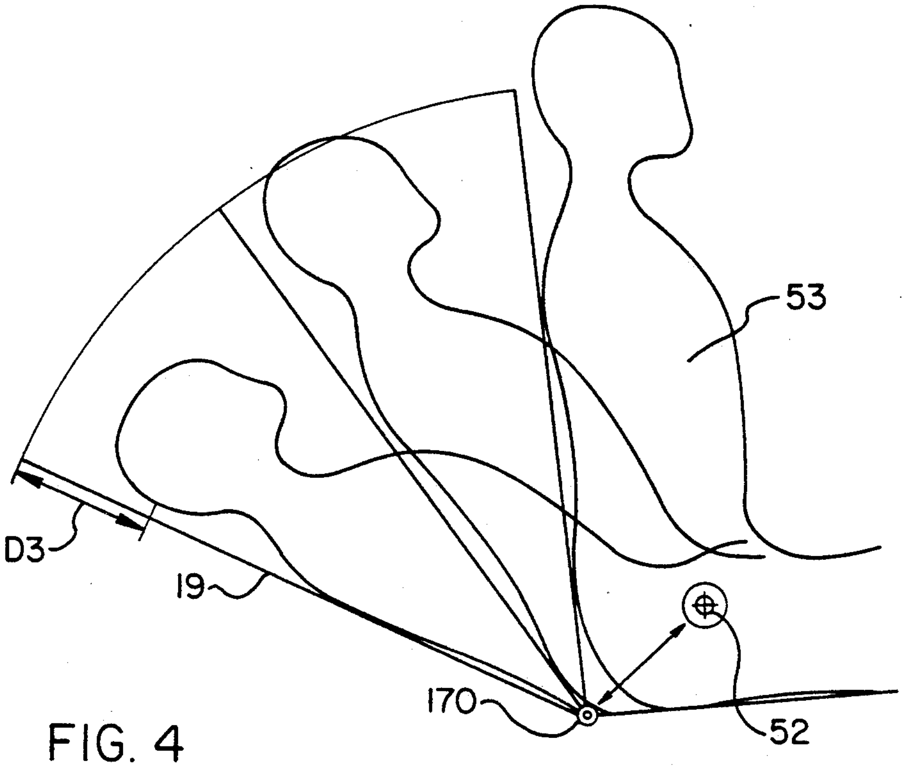
FIG. 4 (PRIOR ART)
FIG. 4 is a schematic of a user during a recline operation.

In FIG. 4 is shown a pivot point 170 in relationship to the user's hip pivot point 52. The user 53 moves a distance $d_3$ on back 19 during the recline operation. Shear is the friction caused by the user 53 moving distance $d_3$.

Figure 5:
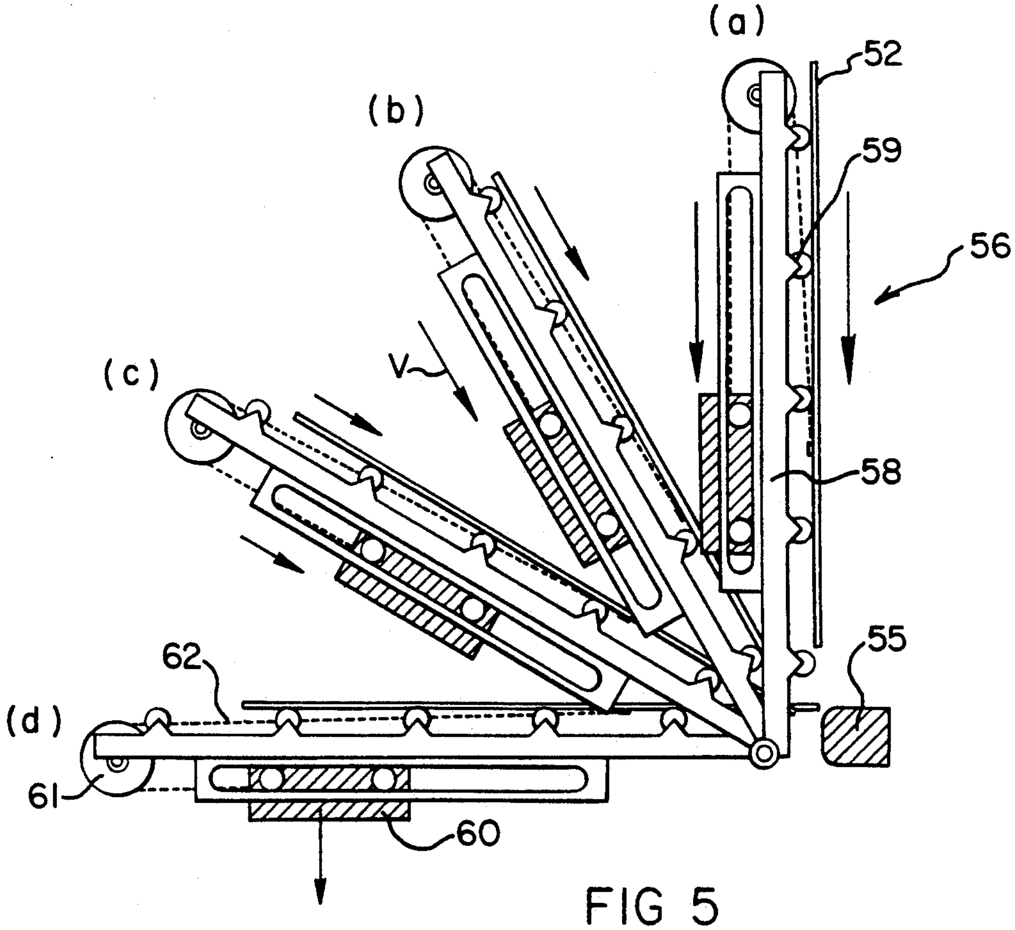
FIG. 5 is a left side plan view of a backrest assembly having a counter balance.

The present invention provides a smart seat which, when presented with a variety of users, will automatically yield the required shear solution. FIG. 5 shows a recliner 54 having a seat 55 and a back assembly 56. The back assembly 56 is comprised of two independent parts, the backplate 57 and the sub-structure 58. The sub-structure 58 further comprises linear bearings 59 which support the backplate 57 which in turn may support any peripheral supports germane to the back, including a headrest, armrests, etc. This mounting scheme allows the backplate 57 to translate up and down with respect to the sub-structure 58 as the back reclines. A counter balance weight 60 is connected via pulley 61 and cable 62 such that the backplate 57 is in equilibrium with counter balance weight 60. The counter balance weight 60 is also mounted on a linear bearing 63 so that it can move easily along the axis of the back. By restricting the counter balance weight 60 motion to the same axis as that of the backplate 57, they remain in equilibrium regardless of recline orientation (positions a, b, c, d). The vector arrows V illustrate that as the backplate 57 reclines, the component of the counter balance force directed along its sliding axis is reduced to equal that of the backplate 57. Thus, the counter balance weight 60 allows the backplate 57 to move with negligible force at the low speeds associated with a reclining back.

A user reclining on backplate 57 by a minor shear (friction) force moves the backplate 57 along with his back as he reclines. Thus, the backplate 57 offers support during recline without initiating detrimental shear forces.

Figure 6A:
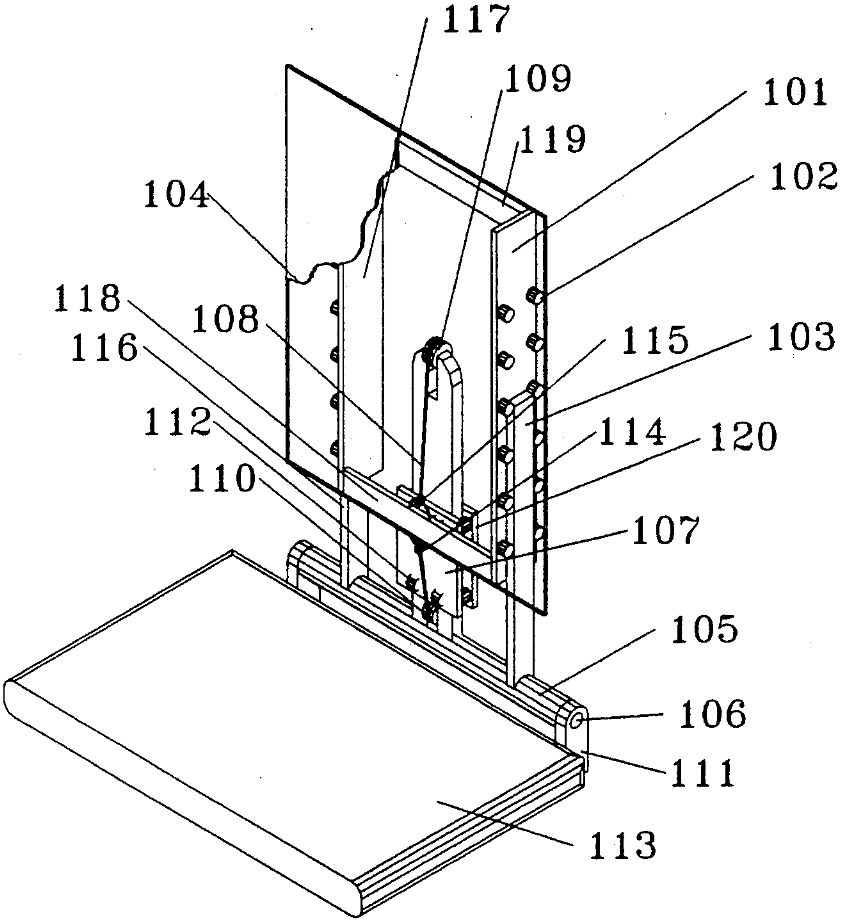
FIG. 6(*a*) is a top perspective view with a partial cutaway of an embodiment of the backrest shown in FIG. 3.
Figure 6B:
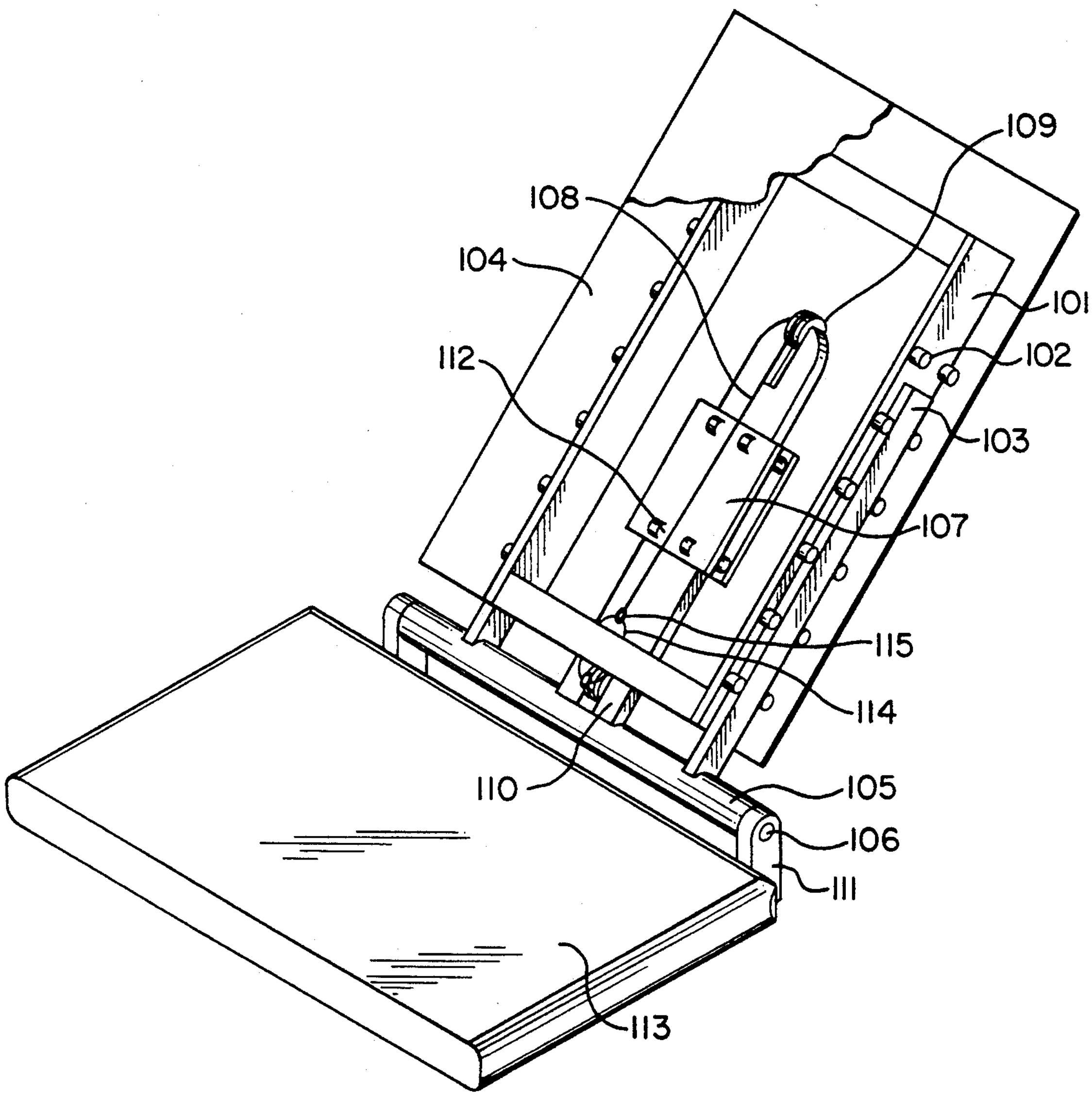

FIGS. 6(*a*)(*b*) show an alternate embodiment of the counter balance invention of FIG. 5. Reclining support rails 103, 116 are affixed to the reclining assembly mounting bar 105. The backplate assembly 104, 117, 101, 118, 119 is kept in equilibrium with counter balance weights 119, 107 by means of cable 108 and pulleys 109, 110. Cable 108 attaches to the backplate assembly member 118 at points 114, 115. Linear bearings 102 support the backplate assembly 104, 117, 101, 118, 119.

Bearings 112 support the counter balance weights 119, 107 during the recline as shown in FIG. 6(*b*). Arm 111 raises the pivot point 106. Seat 113 remains fixed during recline. In operation the user's back creates shear on backplate 104, thereby causing the backplate 104 to move with his body. The counter balance weights 119, 107 minimize the shear required to move the backplate 104.

Figure 7:
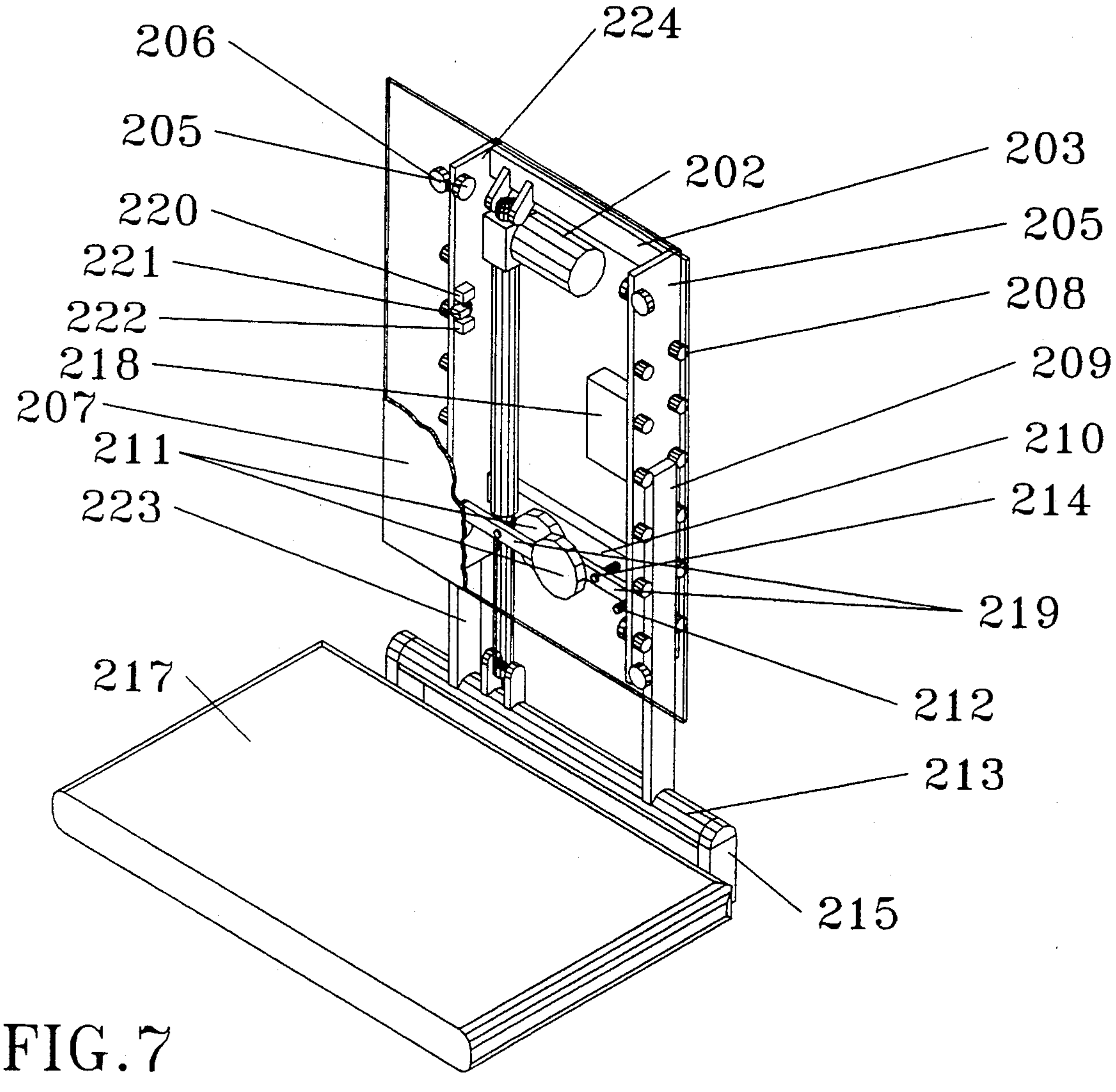
FIG. 7 is a top perspective view with a partial cutaway of an alternate embodiment of the backrest shown in FIG. 3.

Referring next to FIG. 7 a cable-less embodiment of the invention shown in FIGS. 5, 6(*a*)(*b*) is illustrated. Seat 217 remains fixed during recline. Mounting bar 213 has raised pivot point 215. The reclining support rails 209, 223 are affixed to mounting bar 213. The backplate 207 is mounted to carriage assembly 205, 203, 224, 210. Bearings 205, 206 support the backplate 207.

A counter balance 211 communicates to backplate 207 by means of lever arm 219 which is pivotally mounted to carriage member 210 at point 214. Lever arm 219 is further connected to backplate 207 at pivot point 212.

In operation the user's shear is sensed by displacement sensors 220, 222 which sense the movement of activator 221 mounted on backplate 207. A controller 218 activates actuator 202 to move the carriage assembly 205, 203, 224, 210, thereby eliminating shear in a closed loop counter balanced control system.

During recline counter weight 211 balances backplate 207 and moves to a neutral force at full recline. This is an advantage to prior art which used a spring. A spring creates maximum force on a backplate at full recline.

Figure 8:
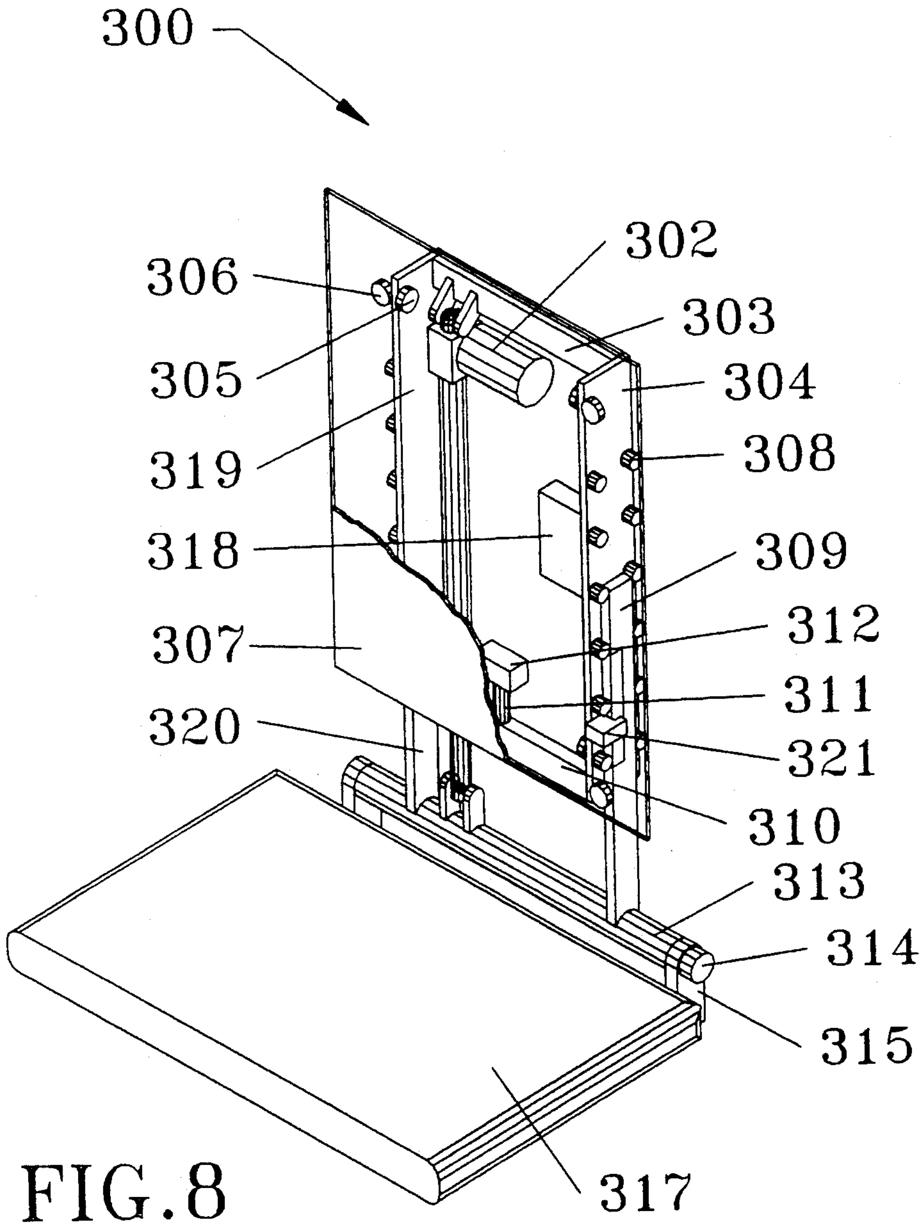
FIG. 8 is a top perspective view with a partial cutaway of a closed loop control embodiment of the backrest shown in FIG. 3.

Referring next to FIG. 8 a non-counterbalanced closed loop controlled recliner 300 is shown. Seat 317 remains stationary during recline. A backplate 307 causes shear during recline which shear is sensed by load cell 311.

Load cell 311 inputs a force value to computer 318. Load cell 311 is mounted to carriage member 310 which in turn is affixed to members 304, 319, 303. Carriage assembly 310, 304, 319, 303 is affixed to recline support rails 309, 320 by means of bearings 308 and moved up and down by actuator 302.

Load cell 311 is also affixed to backplate 307 at mount 312. In operation when the backplate 307 is upright the computer 318 is calibrated to recognize the weight of the backplate 307 along with any accessories such as a back cushion. The potentiometer 314 in combination with the computer 318 recognizes the upright position and all subsequent recline positions.

The computer 318 programatically performs the following steps:

a) input recline angle as generated by the potentiometer only while recline is actuated.
b) compute calibrated backrest force without shear.
c) read load cell force.
d) compare the load cell force to the calibrated force.
e) if the load cell force is greater than the calibrated force, then activate the actuator to move the backrest down until the load cell force is equal to the calibrated force.
f) if the load cell force is equal to the calibrated force, then do nothing.
g) if the calibrated force is less than the load cell force, then activate the actuator to move the backrest up until the load cell force is equal to the calibrated force.

Linear backplate position sensor 321 inputs to the computer 318 the carriage assembly (310, 304, 319, 303) position on the support rails 309, 320. At the upright position the computer relocates the backrest 307 to the preset upper limit of the backrest travel.

Figure 9A:
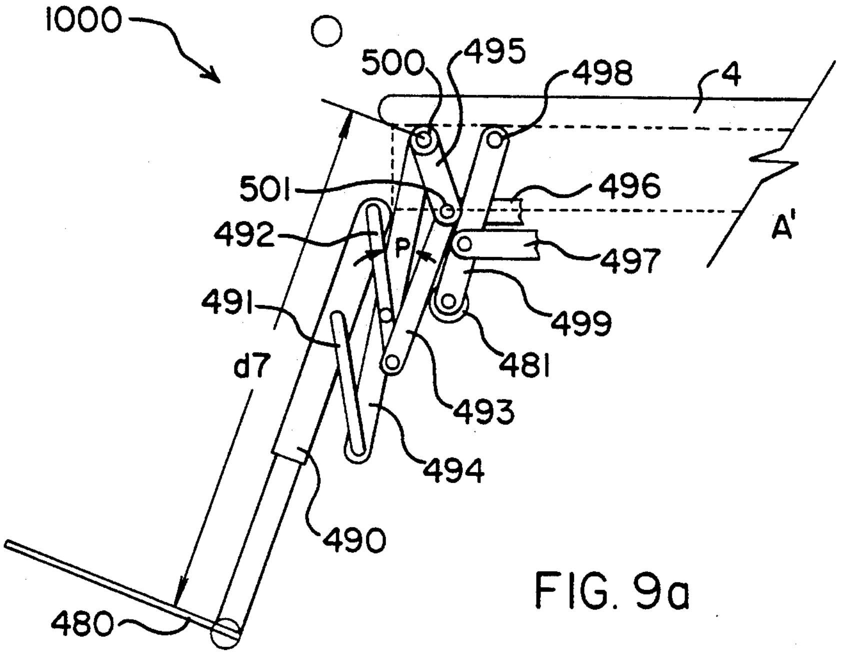
FIG. 9(*a*) is a right side plan view of a four bar linkage independent elevation/recline legrest in the down position.
Figure 9B:
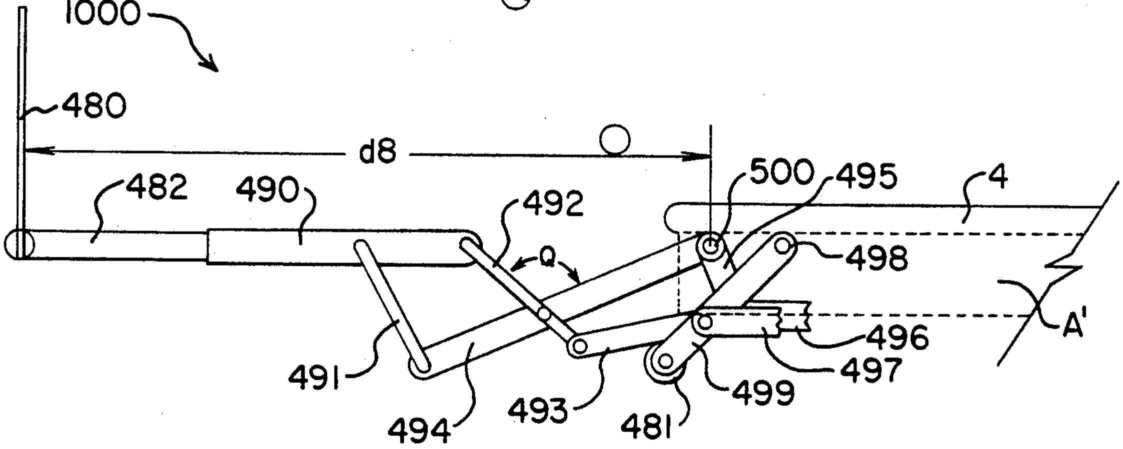
Figure 9C:
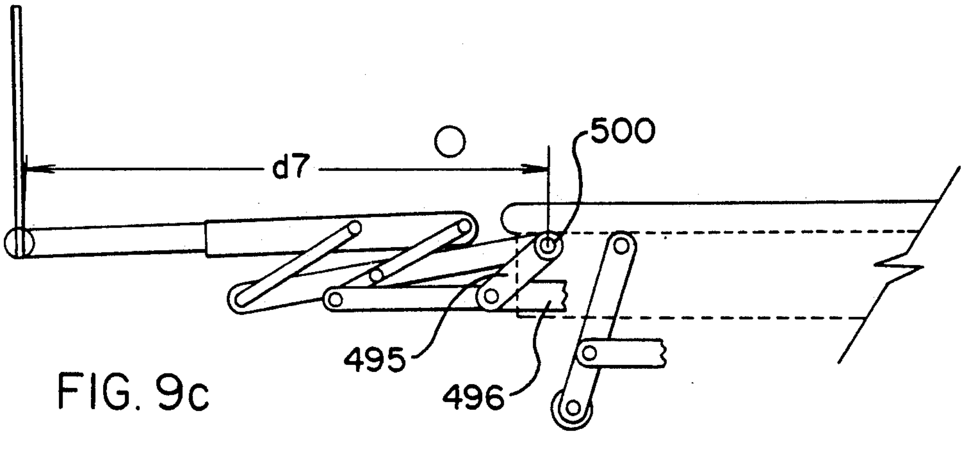

Referring next to FIGS. 9(*a*)(*b*)(*c*), an embodiment of the legrest assembly B of FIG. 3 is depicted. Legrests need to extend during an independent leg elevation (elevating the legrest without reclining the backrest). This is due to the opening of the knee joint during elevation and the resultant extension of the legs. However, when the legs are raised in conjunction with a back recline, the need for legrest extension is diminished, if not eliminated. Thus, the legrest elevation mechanism must differ functionally between either an independent leg elevation and a full recline. A control option during recline must allow for disassociation of the legrest extension apparatus.

FIGS. 9(*a*)(*b*)(*c*) show one embodiment of the above invention generally known as a four bar linkage system. Seat 4 is mounted on wheelchair frame A'. Upper frame members 493, 494 are pivotally affixed to wheelchair frame A' at pivot mounts 500, 501. Frame extending members 491, 492 are pivotally affixed to upper frame members 493, 494 as shown. Frame extending members 491, 492 are also pivotally affixed to calf frame member 490. Footrest 480 is affixed to calf frame member 490.

FIG. 9(*a*) shows the smart legrest in the sitting position with distance $d_7$ (seat 4 to footrest 480) at a minimum. Angle P is acute. In FIG. 9(b), the smart legrest 1000 is in the independent elevation position, and angle Q is obtuse. Recline linkage 495 has been held firm by recline push rod 496, and upper frame members 492, 494 have pivoted to angle Q and resultant distance $d_8$. Independent elevator push rod 497 has activated the elevation of smart legrest 1000 at linkage 499 of upper frame member 493. Roller 481 moves upper frame member 493.

FIG. 9(*c*) shows when recline linkage 495 has been pivoted by recline push rod 496. The elevation has been accomplished with the recline push rod 496. Then angle P would have remained the same, and distance $d_7$ would have stayed the same in the elevated recline position.

Figure 10A:
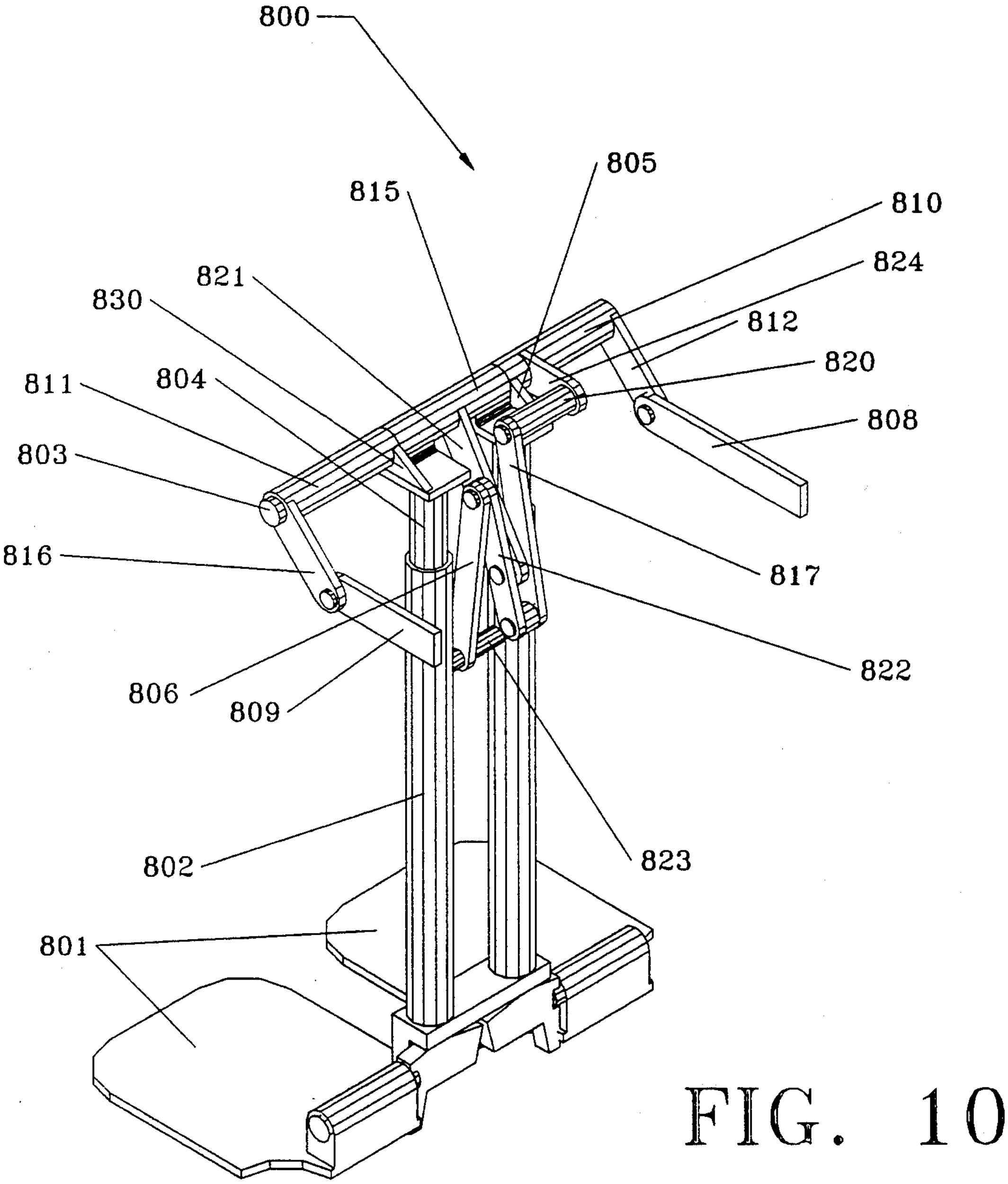
FIG. 10(*a*) is a rear perspective view of an alternate embodiment of an independent elevation/recline legrest.
Figure 10B:
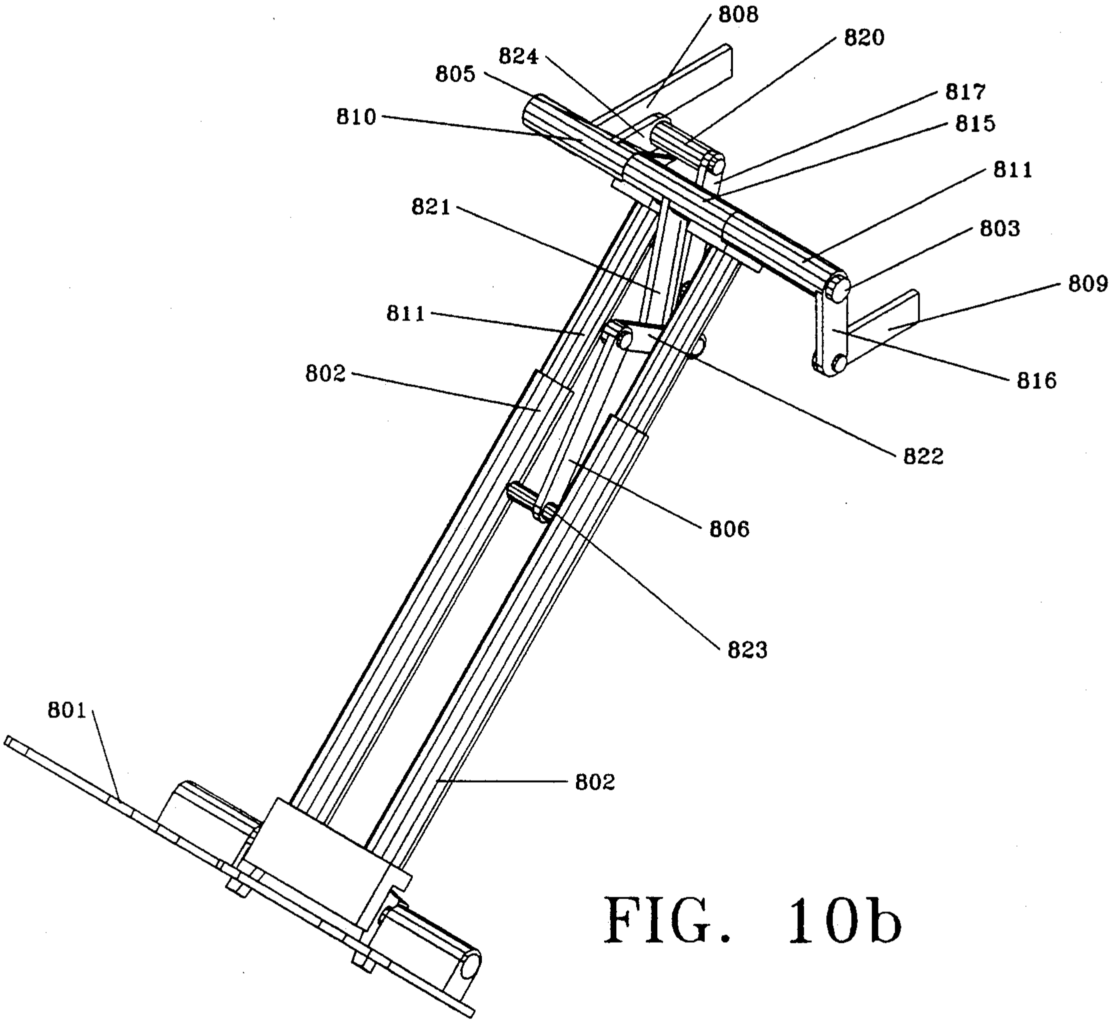

The same invention is shown in an alternate embodiment in FIGS. 10(*a*)(*b*). A smart legrest assembly 800 comprises a footrest 801 which is supported by extension tube 802 which is supported by support tube 804. Support tube 804 pivots around pivot rod 803 and is attached thereto by leg pivot tube 815. Recline tube 810 is fixedly attached to recline pivot arm 812 and pivotally attached to push rod 808. Recline arm 812 is pivotally attached to push rod 808. During recline push rod 808 pushes on recline pivot arm 812, rotating recline tube 810 and tab 805. The assembly 801, 802, 804 is raised without any extension of extension tube 802 along support tube 804. Thus, the user achieves a recline and legrest lift with the desired fixed length of the legrest.

The operation of the independent legrest elevation is accomplished by having independent actuator rod 809 push on independent elevation arm 816. Independent elevation arm 816 is affixed to independent tube 811 which pivots around pivot rod 803. Independent elevation arm 816 is linked by means of tab 830 to leg pivot tube 815 and extension pivot arm 821. Pushing independent elevation arm 816 opens scissors linkage members 817, 822 and 806, thereby extending extension tube 802 along support tube 804. During this operation the upper end of linkage member 817 is held in position by pivot boss 820 and anchor arm 824. Thus, the assembly 801, 802, 804 is extended by linkage 806. Linkage 806 is simultaneously pushed forward by linkage 822, thereby extending extension tube 802 outwards along support tube 804 via pivot axle 823. Thus, the user obtains the desired legrest extension during independent legrest elevation.

Figure 11:
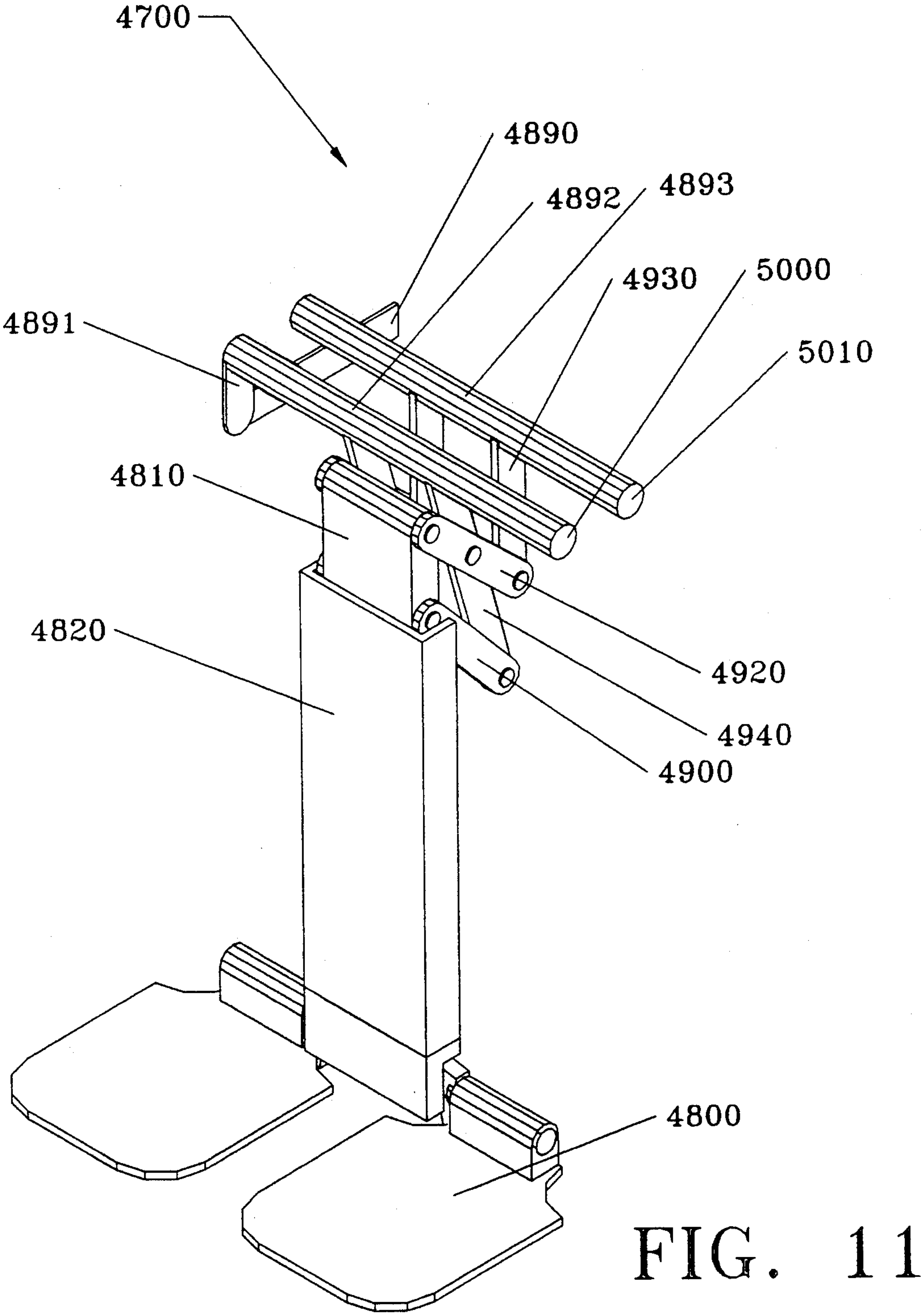
FIG. 11 is a front perspective view of a four bar linkage constant extension legrest.

Referring next to FIG. 11 a simplified version of the four bar linkage system shown if FIGS. 9(*a*)(*b*)(*c*) is shown as elevating legrest 4700. A single lift operation only incorporates legrest extension at all times. The advantage over the prior art is a very strong footrest 4800 and a non-sliding legrest extension assembly having articulating linkages 4920, 4940, 4900, 4930.

In operation push rod 4890 activates pivot arm 4891, thereby rotating forward pivot tube 4892 and linkage 4940. The rotation of linkage 4940 causes the rotation and extension of linkages 4920, 4930. Linkage 4930 is fixedly attached to rear pivot tube 4893. The legrest assembly 4820, 4810, 4800 moves outward by means of elevator linkage 4900. Pivot points 5000, 5010 are fixedly attached to the wheelchair base (not shown).

Figure 12:
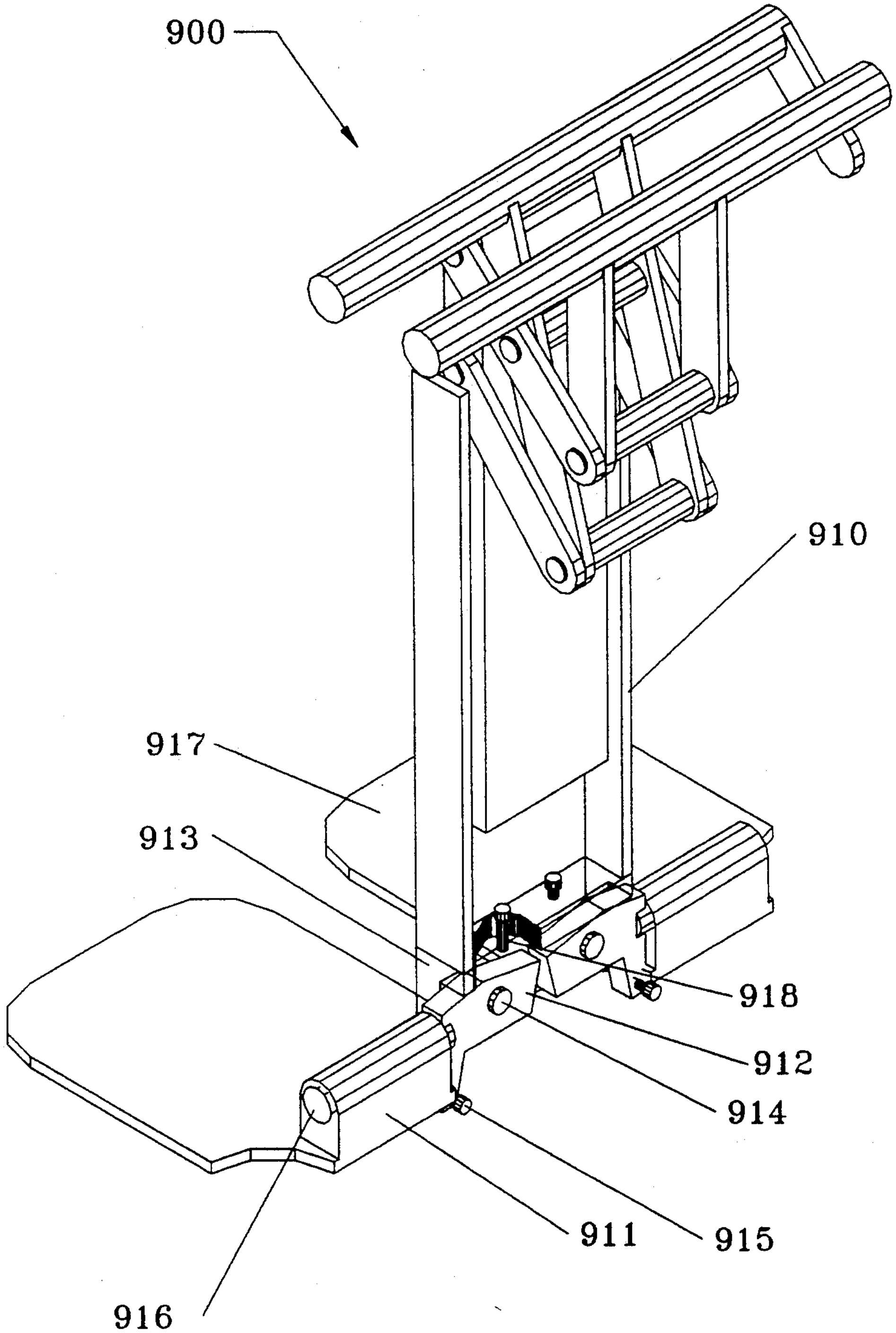
FIG. 12 is a rear perspective view of an improved adjustable lateral tilt foot rest.

Referring next to FIG. 12 an improved footrest 900 has a foot plate 917 (all corresponding parts on the opposite side have a similar function and are unnumbered). Foot plate 917 has a pivot block 911 which pivots about pivot rod 916. Known in the art is an adjustable foot plate stop 915 to provide upward flexion. Lever arm 912 pivots about mounting pivot 914. Footrest support 910 supports fulcrum block 913. Adjusting screw 918 provides new and improved adjustable lateral flexion. This provides better support for contracted lower leg users.

Figure 13:
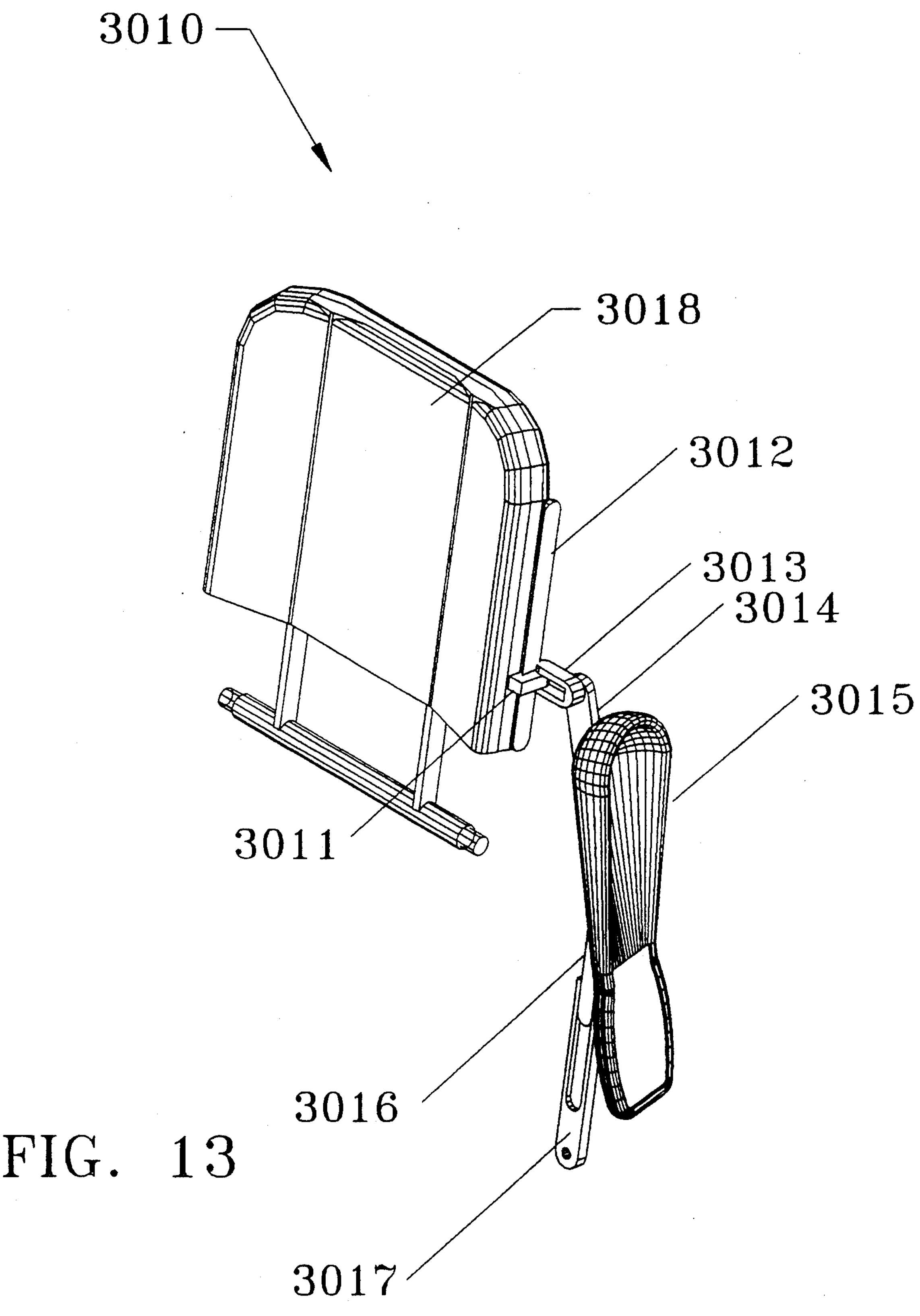
FIG. 13 is a top perspective view of a dual pivoting armrest.

Referring last to FIG. 13 a dual pivoting armrest 3010 is comprised of a reclining backrest 3018 which has an armrest mounting bar 3012. Armrest mounting bar 3012 has a pivot mount 3011 which supports an outward pivot mount 3013. Outwar pivot mount 3013 further supports an up/down support bar 3014. The armrest 3015 has a sliding support arm 3016 which can be positioned adjustably along adjustment rod 3017.

Although the present invention has been described with reference to preferred embodiments, numerous modifications and variations can be made and still the result will come within the scope of the invention. No limitation what respect to the specific embodiments disclosed herein is intended or should be inferred.

I claim:

1. A reclining back assembly for a user comprising:
a pivotable backplate assembly support rail;
a carriage slidably affixed to said support rail;
a backrest affixed to said carriage;
means for reclining said pivotable backplate assembly support rail;
means for sensing shear during recline; and
means for closed loop control responsive to the means for sensing shear during recline to eliminate said shear by moving said carriage.

2. The reclining back assembly of claim 1 wherein said means for reclining further comprises an actuator.

3. The reclining back assembly of claim 1 wherein said means for sensing shear further comprises a load cell having a sensed forced affixed between said backrest and said carriage.

4. The reclining back assembly of claim 3 wherein said means for control further comprises a computer and a recline angle sensor.

5. The reclining back assembly of claim 4 wherein said computer further comprises a program which further comprise the steps of:
(a) receiving a recline angle input from said recline angle sensor;
(b) computing a calibrated backrest force without shear at the recline angle received from the recline angle sensor;
(c) comparing (b) to the load cell sensed force;
(d) if the load cell sensed force is greater than the calibrated backrest force without shear, then move the carriage down to reach the calibrated backrest force;
(e) if the load cell sensed force is less than the calibrated backrest force without shear, then move the carriage up to reach the calibrated backrest force; and
(f) if the load cell force is equal to the calibrated backrest force without shear, then do not move the carriage;

6. The reclining back assembly of claim 5 wherein said means for control further comprises a carriage position sensor and means to move the carriage to the upper preset position when the pivotable backplate assembly support rail is fully upright.

7. A process of eliminating shear in a reclining back assembly having a movable backrest comprising the steps of:
(a) receiving a recline angle input of the reclining back assembly from a recline angle sensor;
(b) computing a calibrated backrest force without shear at the recline angle received from the recline angle sensor;
(c) sensing a backrest force including shear;
(d) comparing (c) to (d), and if $c=d$, then do nothing, and if $b>c$, then moving the backrest down until $b=c$, and if $b<c$, then moving the backrest up until $b=c$.

* * * * *